Patented Feb. 22, 1949

2,462,547

UNITED STATES PATENT OFFICE 2,462,547

DOUBLY ACTIVATED INFRARED PHOSPHORS AND METHODS OF PREPARING SAME

John J. Pitha, Jamaica, and Roland Ward, Brooklyn, N. Y., assignors to Polytechnic Institute of Brooklyn, Brooklyn, N. Y., a corporation of New York No Drawing. Application August 8, 1945, Serial No. 609,714

5 Claims. (Cl. 252—301.4)

This invention relates to novel infra-red phosphors and methods of preparing same.

More particularly the invention relates to infra-red phosphors comprising lanthanum oxy-sulfide as the base material and which have the ability to store energy without appreciable diminution over long periods of time, and to release the stored energy efficiently and with relatively increased brightness when subjected to infra-red stimulation.

The object of the invention is to produce improved products by novel and simple methods, as will hereinafter be pointed out in the description and appended claims.

In the previous preparation of infra-red phosphors, it has usually been necessary to prepare the base material and incorporate the activator therein by means of a flux. Thus the mixture has to be subjected to an additional heating operation and contains materials which per se do not usually improve the efficiency of the phosphor. In accordance with the present invention, such use of flux materials is unnecessary.

The lanthanum oxy-sulfide ($La_2O_2S$) phosphors of the present invention may be simply and easily prepared in two ways:

1. Starting with lanthanum sulfate $$[La_2(SO_4)_3]$$

or lanthanum oxy-sulfate ($La_2O_2SO_4$); the phosphors may be prepared by activating either of the aforesaid materials by water solutions of the activator salts, drying the mixture in the oven and then reducing it in an atmosphere of a reducing gas, such as hydrogen, at an elevated temperature.

2. Or one may start with lanthanum oxide $La_2O_3$ and lanthanum sulfide $La_2S_3$ and, after activating the oxide with a water solution of the activator salts and drying same, may mix the oxide and sulfide in the proper proportions and heat the mixture until a white powder is obtained.

From the losses in weight on heating and from analysis of the compounds formed, it is apparent that the main reaction proceeds as follows:

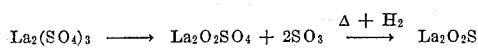

$$La_2(SO_4)_3 \xrightarrow{\Delta + H_2} La_2O_2SO_4 + 2SO_3 \longrightarrow La_2O_2S$$

Specific examples may be given as follows:

To 2 grams of lanthanum sulfate [$La_2(SO_4)_3$] are added 1.0 milligram europium (added as europium nitrate solution), and 0.4 milligram lead (added as lead nitrate solution). This mixture may be dried at 200° C. in an electric oven, and then transferred to a platinum boat and put into a furnace at 800° C. in an atmosphere of hydrogen for fifteen minutes. The resultant product, when excited with ultra-violet light, gives a yellow-orange phosphor which, when stimulated with infra-red light, gives off a yellow glow.

Similarly an infra-red phosphor which emits a green light when stimulated with infra-red light can be made from lanthanum oxy-sulfide ($La_2O_2S$), activated with 0.1 milligram lead and 0.2 milligram indium per gram of material.

Other activators of the double type which may be used are europium coupled with bismuth, samarium, gadolinium, indium, and the like; and indium also gives infra-red phosphors when coupled with bismuth, copper and samarium.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In a method of making infra-red phosphors, the step comprising preparing lanthanum oxy-sulfide by treating a compound of the class consisting of lanthanum sulfate and lanthanum oxy-sulfate, with a reducing gas at about 800° C. in the presence of a double activator of the group consisting of europium coupled with a member of the group consisting of lead, bismuth, samarium, gadolinium and indium and of indium coupled with a member of the group consisting of lead, bismuth, copper and samarium, and until a white compound is formed.

2. In a method of making infra-red phosphors, the step comprising preparing lanthanum oxy-sulfide by treating a compound of the class consisting of lanthanum sulfate and lanthanum oxy-sulfate, with hydrogen at about 890° C. in the presence of a double activator of the group consisting of europium coupled with a member of the group consisting of lead, bismuth, samarium, gadolinium and indium and of indium coupled with a member of the group consisting of lead, bismuth, copper and samarium, and until a white compound is formed.

3. A method of making infra-red phosphors, which comprises treating one of the materials of the class consisting of lanthanum sulfate and lanthanum oxy-sulfate with a water solution of a double activator of the group consisting of europium coupled with a member of the group consisting of lead, bismuth, samarium, gadolinium and indium and of indium coupled with a member of the group consisting of lead, bismuth, copper and samarium, drying the mixture at a temperature of about 200° C., and reducing the dry mixture at a temperature of about 800° C. in an atmosphere of hydrogen until a white compound is formed.

4. A method for making infra-red phosphors, which comprises forming lanthanum oxysulfide by heating a member of the class consisting of lanthanum sulfate, lanthanum oxy-sulfate and a mixture of lanthanum-oxide and lanthanum sulfide with a double activator of the group consisting of europium coupled with a member of the group consisting of lead, bismuth, samarium, gadolinium and indium and of indium coupled with a member of the group consisting of lead, bismuth, copper and samarium in a reducing atmosphere at a temperature of about 800° C. until a white compound is formed.

5. As a new composition of matter, an infra-red phosphor consisting essentially of lanthanum oxy-sulfide and a double activator of the group consisting of europium coupled with a member of the group consisting of lead, bismuth, samarium, gadolinium and indium and of indium coupled with a member of the group consisting of lead, bismuth, copper and samarium, said double activators being present in activator proportions.

JOHN J. PITHA.
ROLAND WARD.

REFERENCES CITED

The following references are of record in the file of this patent:

UNITED STATES PATENTS

| Number | Name | Date |
|--------|------|------|
| 2,049,765 | Fischer | Aug. 4, 1936 |

OTHER REFERENCES

Chemical Abstracts, vol. 25, page 1751; vol. 26, page 1207.